United States Patent
Helfenstein et al.

(10) Patent No.: US 7,010,025 B1
(45) Date of Patent: Mar. 7, 2006

(54) CIRCUIT AND METHOD FOR AN IMPROVED FRONT END IN DUPLEX SIGNAL COMMUNICATION SYSTEMS

(75) Inventors: Markus Helfenstein, New York, NY (US); Drahoslav Lim, San Diego, CA (US); George S. Moschytz, Zurich (CH); Arnold Muralt, Fair Haven, NJ (US)

(73) Assignee: GlobespanVirata, Inc., Red Bank, NJ (US)

( * ) Notice: Subject to any disclaimer, the term of this patent is extended or adjusted under 35 U.S.C. 154(b) by 769 days.

(21) Appl. No.: 09/862,952

(22) Filed: May 22, 2001

Related U.S. Application Data

(60) Provisional application No. 60/206,034, filed on May 22, 2000.

(51) Int. Cl.
*H04B 1/38* (2006.01)
*H04L 5/16* (2006.01)

(52) U.S. Cl. .................. 375/219; 379/345; 379/394; 379/398; 370/379; 333/117; 343/822; 340/310.05; 326/30

(58) Field of Classification Search ............ 375/219, 375/229, 222; 379/398, 394
See application file for complete search history.

(56) References Cited

U.S. PATENT DOCUMENTS

| | | | |
|---|---|---|---|
| 3,881,158 A * | 4/1975 | Orchard et al. | 330/84 |
| 4,539,566 A * | 9/1985 | Sharpe et al. | 342/389 |
| 5,909,463 A * | 6/1999 | Johnson et al. | 375/220 |
| 6,226,322 B1 * | 5/2001 | Mukherjee | 375/229 |
| 6,298,046 B1 * | 10/2001 | Thiele | 370/282 |
| 6,314,181 B1 * | 11/2001 | Pett | 379/398 |
| 6,317,464 B1 * | 11/2001 | Le et al. | 375/257 |

OTHER PUBLICATIONS

An Integrated Adaptive Analog Balancing Hybrid For Use In (A) DSL Modems, Frédéric Pécourt, Jörg Hauptmann, Aner Tenen, 1999 IEEE International Solid-State Circuits Conference, ISSCC99/Session 14Paper TP 14.8, Feb. 16, 1999, pp. 252-253, 466.

* cited by examiner

Primary Examiner—Stephen Chin
Assistant Examiner—Harry Vartanian
(74) Attorney, Agent, or Firm—Thomas, Kayden, Horstemeyer & Risley

(57) ABSTRACT

An improved analog front end and methods for increasing the power efficiency of duplex signals on a transmission line are disclosed. The improved analog front end bifurcates a hybrid into a fixed portion and an adaptive portion. The adaptive portion combines a biquad and a summer to produce a filter transfer function suited to compensate for transmission line irregularities. A method for configuring a local transceiver to minimize power requirements at a remote transmitter is disclosed. Broadly the method entails, applying a transmit signal to a front end in the absence of a remote signal; optimizing the transmit signal power; recording the reflected transmit signal; applying an adaptive filter in response to transmission line irregularities; and controllably adjusting the adaptive filter to minimize the amplitude of the reflected version of the transmit signal in the receive path. A method for recovering a remotely generated signal is also disclosed. The method entails, applying a local transmit signal to the front end in the absence of a remote signal; recording a reflected version of the transmit signal in the receive path; controllably adjusting an adaptive portion of the front end to minimize the amplitude of the reflected version of the local transmit signal; and combining a scaled replica of the local transmit signal with a plurality of adaptive filter outputs to recover a remotely generated receive signal from the transmission line.

21 Claims, 8 Drawing Sheets

X - is indicative of a signal polarity inversion

CIRCUIT AND METHOD FOR AN IMPROVED FRONT END IN DUPLEX SIGNAL COMMUNICATION SYSTEMS

CROSS-REFERENCE TO RELATED APPLICATION

The present application claims the benefit of co-pending U.S. Provisional Patent Application, issued Ser. No. 60/206,034, and filed May 22, 2000, which is hereby incorporated by reference in its entirety.

FIELD OF THE INVENTION

The present invention generally relates to high-speed data communications on a two-wire transmission line. More specifically, the invention relates to an improved front end, which solves problems associated with power efficiency, recovering receive signals from a duplex signal transmission, and impedance variances associated with two-wire transmission lines.

BACKGROUND OF THE INVENTION

With the advancement of technology, and the need for instantaneous information, the ability to transfer digital information from one location to another, such as from a central office (CO) to a customer premise (CP) has become more and more important.

In a digital subscriber line (DSL) communication system, and more particularly an xDSL system, where "x" indicates a plurality of various standards used in the data transfer, data is transmitted from a CO to a CP via a transmission line, such as a two-wire twisted pair, and is transmitted from the CP to the CO as well, either simultaneously or in different communication sessions. The same transmission line might be utilized for data transfer by both sites or the transmission to and from the CO might occur on two separate lines.

A hybrid circuit is introduced at both the CO and the CP to separate the respective transmit signals from the CO and the CP from the receive signals at each end of the two-wire transmission line for the case where both the CO and the CP communicate with each at the same time over the two-wire transmission line. For example, a hybrid circuit at the CO serves as an electrical bridge that removes all but a small portion of the downstream data transmission intended for the respective CP from a receive signal transmitted in the upstream direction by customer devices (via a CP hybrid) at the CP.

Generally, in systems for transmitting data over twisted-pair loops, the hybrid circuit accomplishes this duplex filtering task with an appropriately configured electrical bridge. The electrical bridge or balance network is selected to match the two-wire twisted pair loop impedance. These two impedances, namely the twisted-pair loop impedance and the impedance of the balance network, should closely match in order for the hybrid to successfully prevent transmit signals from feeding into the receive signal path. Twisted-pair loop impedances are determined by wire type (i.e., gauge and material composition), loop length, and bridged taps. Bridged taps are sections of wire coupled to the twisted-pair two-wire loop not on the direct path between the CP and the CO.

Prior art hybrids with fixed passive balance networks have been optimized for installation with typical twisted-pair loops. However, these fixed balance network hybrids suffer from the disadvantage that twisted-pair loop impedances often stray dramatically from "typical." Stated another way, fixed balance networks do not offer the flexibility required to match the impedance of the various twisted-pair loops encountered in the public switched telephone network (PSTN) and other various networks that communicate via a two-wire pair. Not only are fixed balance network hybrids disadvantageous when installed in association with a twisted-pair loop having one or more bridged taps, a different length or wire gauge, but changes in the loop impedance during operation result in less echo rejection of the local transmit signal from the receive path.

It will be appreciated, from the aforementioned disadvantages that result from the inflexibility of a fixed balance network, that an adaptable balance network is desirable. An adaptive balance network is described in an article by Pecourt et al., entitled, "An Integrated Adaptive Analog Balancing Hybrid," IEEE Solid State Circuits Conference, San Francisco, 1999. The adaptable balance network disclosed by Pecourt et al. discloses an implementation that adaptively adjusts the entire balance network of the hybrid.

The Pecourt et al. solution of adaptively adjusting the entire balance network consumes significant computing resources. Furthermore, Pecourt's methodology fails to take advantage of telephone industry standards that dictate the electrical properties of the line transformer and the tip and ring circuits.

The Pecourt et al. solution makes several assumptions, which lead to a problematic circuit that does not perform as Pecourt indicated when applied in an ADSL system. ADSL service co-exists on a transmission line with POTS (or ISDN). As a result, the input to an ADSL modem or transceiver must have a frequency dependent filter (in this case a high-pass filter) so as to not disturb the POTS frequency band. (Frequently an external splitter is added that effectively performs the filtering.) The impedance of the high-pass filter or external splitter in combination with the transmission line is mandated by International Telecommunication Union (ITU) standards. The required frequency dependence means that the hybrid network must match not just the transmission line, but the transmission line as viewed through the isolation transformer and the high-pass (or external splitter).

Furthermore, ADSL is usually operated in a frequency-division multiplex (FDM) mode, (i.e., ADSL separates up-stream and down-stream frequency bands). As a result, the up-stream and down-stream data rates are limited by noise rather than transmission echo (as is the case for symmetric DSL services, which use the same frequency band for up-stream and down-stream signal transmissions), hence the noise level of any adaptive hybrid is crucial.

Pecourt et al. assumes that the line impedance can be matched with a $1^{St}$ order filter and that a $2^{nd}$ order filter can be used in the presence of a bridged tap. Furthermore, Pecourt et al. indicates that for the ADSL customer side, the frequency range of interest is limited to 150 kHz. These two assumptions are incorrect: the high-pass filter impedance must be taken into account, and matching above 150 kHz cannot be ignored.

The isolation transformer and high-pass filter increase the order of the matching function, so that the matching function behaves as a $3^{rd}$ order function even in the absence of bridged taps. A bridged tap or other impedance effect on the transmission line increases the order of the matching function beyond a $3^{rd}$ order function.

The hybrid cannot "stop working" at 150 kHz (the upper limit of the CP transmitter band for ADSL over POTS is 138 kHz) because the transmitter will transmit noise and distortion throughout the receive band (138 kHz to 1104 kHz for ADSL with POTS). This interference will corrupt the receive signal unless it is suppressed by the hybrid. (This fact is mentioned in the Pecourt article.) It is true that the AGC gain is set mainly by the echo, but if the frequencies outside of the echo are drowned in transmit signal related noise, remotely generated signal transmissions will be difficult to recover.

The Pecourt et al. article describes a system where the full hybrid is implemented on an integrated circuit or chip. This implementation requires prohibitively large capacitors in the circuit (C1 and C2 in Pecourt's FIG. 14.8.4) to achieve good noise levels. Furthermore, when the requisite high-pass filter and isolation transformer are added, there are no degrees of freedom "left" for the bridged taps, etc. In fact, Pecourt's solution does not offer sufficient flexibility to match the combination of the isolation transformer and high-pass filter. Moreover, Pecourt's solution does not function above 150 kHz, where the remotely generated or receive signal gets corrupted by the local transmit signal noise and distortion.

SUMMARY OF THE INVENTION

Accordingly, there is a need for an improved front end that uses a modified hybrid to reduce transmit signal reflections from entering a receive signal path. The modified hybrid enables a receiver to adaptively recover a remotely generated signal from a duplex signal transmission on a two-wire transmission line.

In light of the foregoing, a circuit and method for an improved front end for optimally recovering a remotely generated signal (i.e., a receive signal) from a duplex signal transmission are provided. The improved front end contains a modified hybrid that uses both a fixed portion and an adaptive portion to form a balance network capable of more closely matching varying impedance characteristics associated with two-wire twisted pair loops. The modified hybrid, when applied in association with a tuning algorithm performed at system startup (e.g., prior to the presence of a remote transmission on the twisted pair), provides a power efficient full duplex solution for minimizing transmit power requirements at remote transmitters. Furthermore, the modified hybrid provides a system and method for adjusting the front end of a transceiver during operation to compensate for environmental changes, which may vary over time.

In a preferred embodiment, the modified hybrid comprises a balance network that is distributed across a fixed portion and an adaptive portion. The fixed portion of the modified hybrid may contain a network suited for matching the characteristics of the line transformer and a characteristic impedance of a local loop. The adaptive portion of the modified hybrid may contain a combination of a biquad resonator and a summer.

A portion of the filtering (i.e., shaping) of the echo or local transmit signal is performed first by the fixed hybrid portion external to an application-specific integrated circuit (ASIC). The fixed hybrid portion will consist of fixed and passive circuit components. Then, a portion of the pre-filtered signal is filtered again in the adaptive portion of the modified hybrid. The final replica of the local transmit signal is not actually generated in the process. Rather, signal components are weighted and mathematically combined with the receive signal in a single operation at a hybrid amplifier.

A method for configuring a local transceiver to minimize the transmit power required at a remote transmitter is disclosed. In its broadest terms, the method can be practiced by performing the following steps: applying a locally generated transmit signal to an improved front end in the absence of a remote signal, the front end containing a hybrid having a balance network further comprising a fixed portion and an adaptive portion; optimizing the transmit signal power; recording a reflected version of the optimized transmit signal in a receive path; adaptively applying the adaptive portion of the balance network when indicated by at least one characteristic associated with the reflected transmit signal; controllably adjusting the adaptive portion of the balance network to minimize the amplitude of the reflected version of the transmit signal in the receive path; and notifying a remote transceiver to initiate a self-directed transmit signal power optimization scheme.

A method for recovering a remotely generated signal from a transmission line in a duplex communication system is also disclosed. In its broadest terms the method can be practiced by performing the following steps: applying a locally generated transmit signal to an improved front end in the absence of a remote transmit signal, the front end containing a hybrid having a balance network further comprising a fixed portion and an adaptive portion; recording a reflected version of the optimized transmit signal in a receive path; controllably adjusting the adaptive portion of the balance network to minimize the amplitude of the reflected version of the locally generated transmit signal in the receive path; and combining a scaled replica of the locally generated transmit signal with a remotely generated duplex signal on a transmission line to recover a remotely generated receive signal from the transmission line.

Other features and advantages of the present invention will become apparent to one skilled in the art upon examination of the following drawings and detailed description. It is intended that all such additional features and advantages be included herein within the scope of the present invention, as defined by the claims.

BRIEF DESCRIPTION OF THE DRAWINGS

The present invention will be more fully understood from the detailed description given below and from the accompanying drawings of the preferred embodiment of the invention, which however, should not be taken to limit the invention to the specific embodiments enumerated, but are for explanation and for better understanding only. Furthermore, the drawings are not necessarily to scale, emphasis instead being placed upon clearly illustrating the principles of the invention. Finally, like reference numerals in the figures designate corresponding parts throughout the several drawings.

DETAILED DESCRIPTION OF THE PREFERRED EMBODIMENT

The detailed description presented herein focuses on elements from the perspective of a CP located printed circuit line card within a xDSL communication system. This explanation and description, however, are by way of example only. Those skilled in the art will appreciate that the concepts and teachings disclosed herein may be applied to various front ends as may be found in a plethora of various communication systems.

Figure 1:
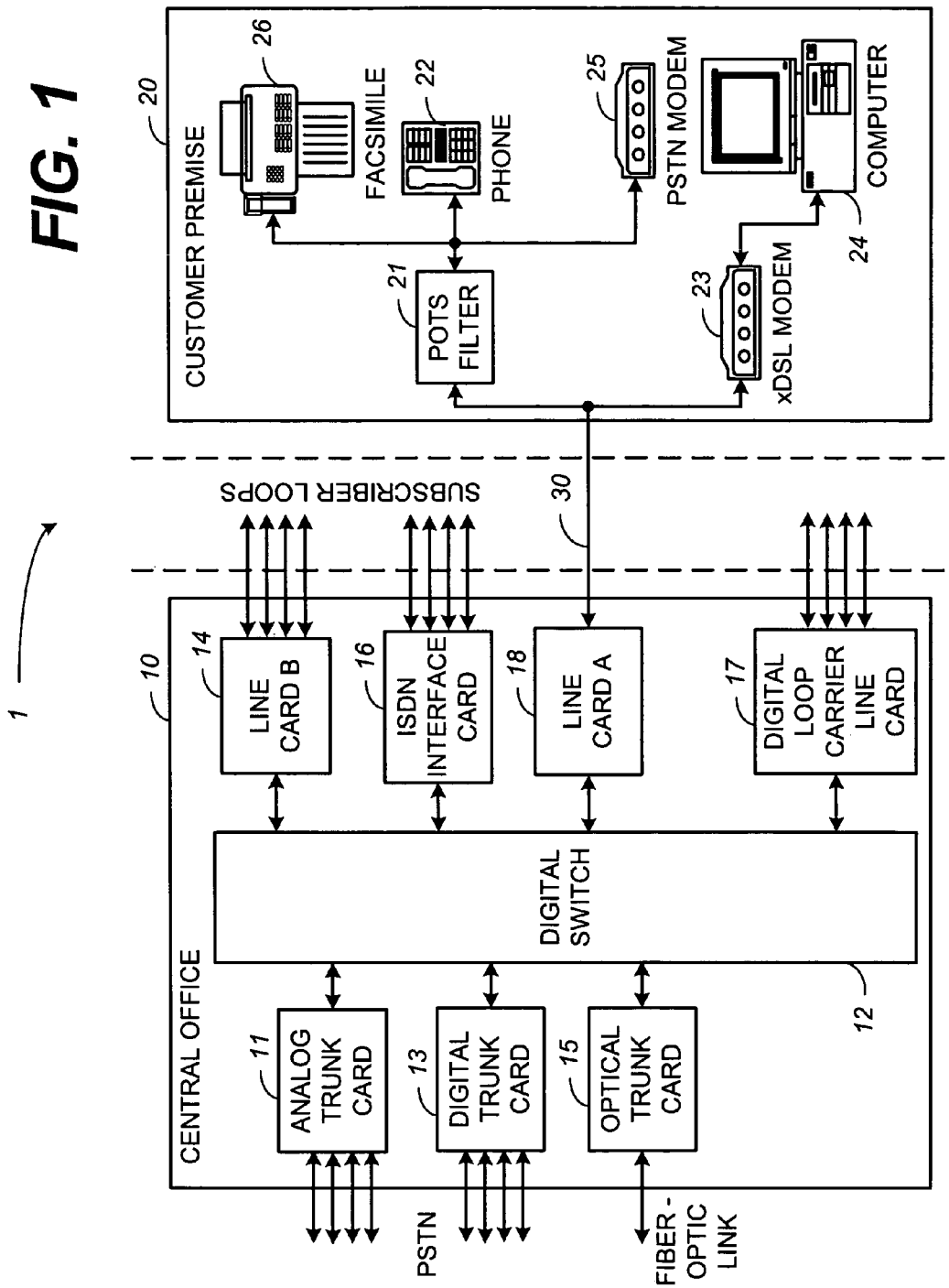
FIG. 1 is a block diagram illustrating a xDSL communications system between a central office (CO) and a customer premise (CP).

Turning now to the drawings illustrating the present invention, wherein like reference numerals designate corresponding parts throughout the drawings, reference is directed to FIG. 1, which illustrates a xDSL communication system 1. Specifically, FIG. 1 illustrates communication between a central office (CO) 10 and a customer premise (CP) 20 by way of twisted-pair telephone line 30. While the CP 20 may be a single dwelling residence, a small business, or other entity, it is generally characterized as having plain old telephone system (POTS) equipment, such as a telephone 22, a public switched telephone network (PSTN) modem 25, a facsimile machine 26, etc. The CP 20 may also include an xDSL communication device, such as an xDSL modem 23 that may permit a computer 24 to communicate with one or more remote networks via the CO 10. When a xDSL service is provided, a POTS filter 21 might be interposed between POTS equipment (e.g., the telephone 22 and the facsimile machine 26) and the twisted-pair telephone line 30. As is known, the POTS filter 21 includes a low-pass filter having a cut-off frequency of approximately 4 kilohertz to 10 kilohertz, in order to filter high frequency transmissions from the xDSL modem 23 and to protect the POTS equipment from the higher frequency xDSL equipment.

At the CO 10, additional circuitry is typically provided. Generally, a line card (i.e., Line Card A) 18 containing line interface circuitry is provided to communicatively couple various xDSL service related signals along with PSTN voice signals on the twisted-pair telephone line 30. In fact, multiple line cards 14, 18 may be provided to serve a plurality of copper telephone subscriber loops. In the same way, additional interface circuit cards are typically provided at the CO 10 to handle different types of services. For example, an integrated services digital network (ISDN) interface card 16, a digital loop carrier line card 17, and other circuit cards, for supporting various communication services, may be provided.

A digital switch 12 is also provided at the CO 10. The digital switch 12 is configured to communicate with each of the various line cards 14, 16, 17, and 18. At a PSTN interface side of the CO (i.e., the side opposite the various line cards 14, 16, 17, and 18 supporting the telephone system subscriber loops), a plurality of trunk cards 11, 13, and 15 are typically provided. For example, an analog trunk card 11, a digital trunk card 13, and an optical trunk card 15 are illustrated in FIG. 1. Typically, these circuit cards have outgoing lines that support numerous multiplexed xDSL service signal transmissions.

Figure 2:
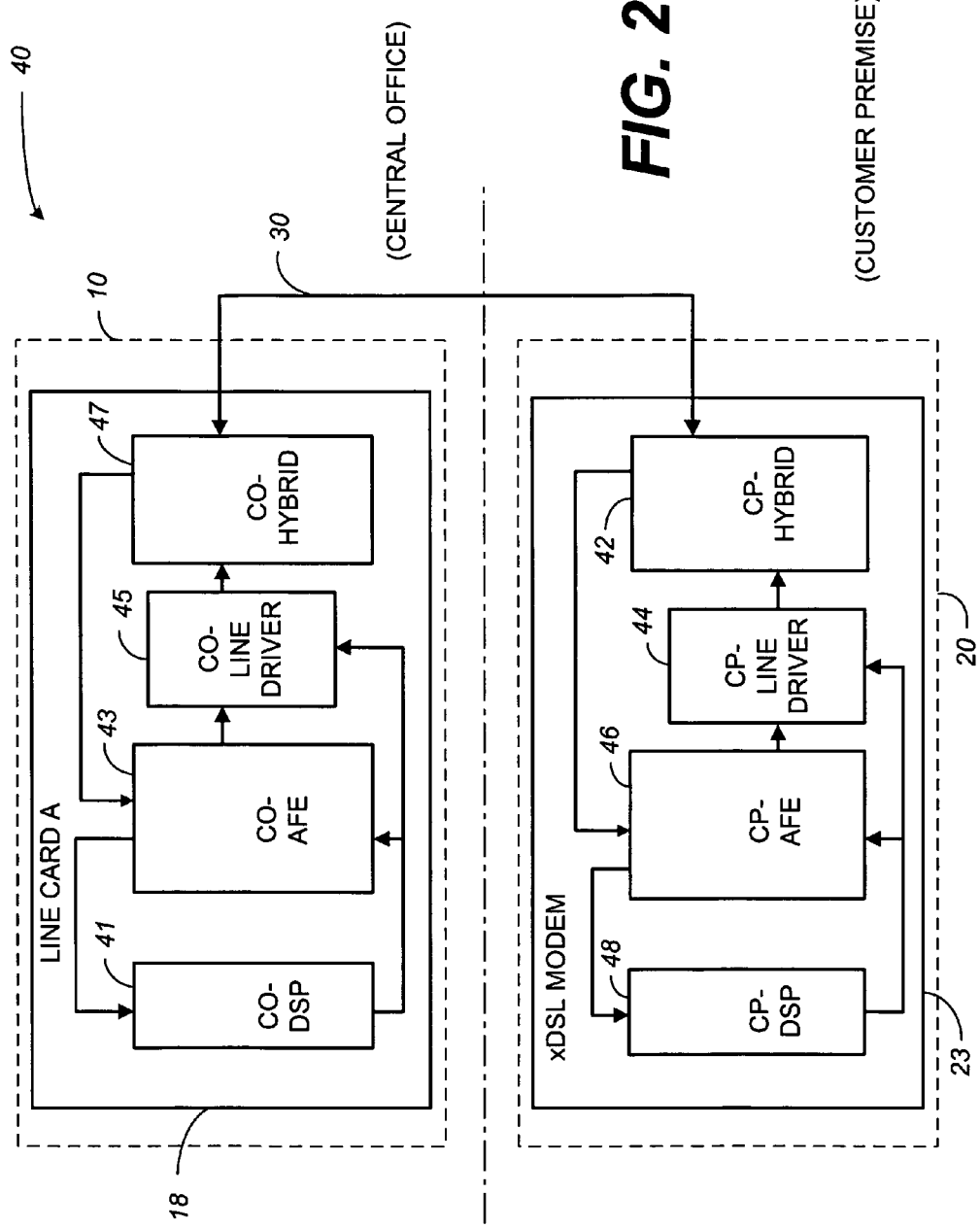
FIG. 2 is a functional block diagram illustrating a xDSL communication link between a line card and a xDSL modem in the xDSL communication system of FIG. 1.

The conventional xDSL communication system 1 illustrated and described with regard to the schematic diagram of FIG. 1, is further detailed with regard to FIG. 2. Reference is now directed to FIG. 2, which presents a functional block diagram illustrating various functional elements in a xDSL communications link 40 between the line card 18 (within the CO 10) and the xDSL modem 23 (located at the CP 20) introduced in FIG. 1. In this regard, the xDSL communications link 40 of FIG. 2 illustrates data transmission from the CO 10 to the CP 20 via the transmission line 30. For example, the transmission line 30 may take the form of a twisted-pair telephone transmission line as may be provided by a POTS service provider to complete a designated link between the CO 10 and the CP 20.

As illustrated in FIG. 2, data transmissions may be directed from the CP 20 to the CO 10, from the CO 10 to the CP 20, or in both directions simultaneously. Furthermore, data transmissions can flow on the same twisted-pair telephone transmission line 30 in both directions, or alternatively on separate transmission lines (one shown for simplicity of illustration). Each of the separate transmission lines may be designated to carry data transfers in a particular direction either to or from the CP 20.

The CO 10 may include a printed circuit line card 18 (see FIG. 1) that includes a CO-digital signal processor (DSP) 41, which receives digital information from one or more data sources (not shown) and sends the digital information to a CO-analog front end (AFE) 43. The CO-AFE 43 interposed between the twisted-pair telephone transmission line 30 and the CO-DSP 41 may convert digital data, from the CO-DSP 41, into a continuous time analog signal for transmission to the CP 20 via the one or more twisted-pair telephone transmission lines 30.

One or more analog signal representations of digital data streams supplied by one or more data sources (not shown) may be converted in the CO-AFE 43 and further amplified and processed via a CO-line driver 45 before transmission by a CO-hybrid 47, in accordance with the amount of power required to drive an amplified analog signal through the twisted-pair telephone transmission line 30 to the CP 20.

As also illustrated in FIG. 2, the xDSL modem 23 located at the CP 20 may comprise a CP-hybrid 42. The CP-hybrid 42 may be used to de-couple a received signal from the transmitted signal in accordance with the data modulation scheme implemented by the particular xDSL data transmission standard in use. A CP-AFE 46, also located at the CP 20, may be configured to receive the de-coupled received signal from the CP-hybrid 42. The CP-AFE 46 may be configured to convert the received analog signal into a digital signal, which may then be transmitted to a CP-DSP 48 located at the CP 20. Finally, the digital information may be further transmitted to one or more specified data sources such as the computer 24 (see FIG. 1).

In the opposite data transmission direction, one or more digital data streams supplied by one or more devices in communication with the CP-DSP 48 at the CP 20 may be converted by the CP-AFE 46 and further amplified via a CP-line driver 44. As will be appreciated by those skilled in the art, the CP-line driver 44 may amplify and forward the transmit signal with the power required to drive an amplified analog signal through the twisted-pair telephone transmission line 30 to the CO 10.

It is significant to note that the CP-hybrid 42 is used to regenerate the transmit signal so it may be subtracted from the receive signal when the DSL communication system 1 is receiving at the CP 20. As a result, the CP-hybrid 42 does not affect the transmitted signal in any way. The CO-AFE 43 may receive the data from the CO-hybrid 47, located at the CO 10, which may de-couple the signal received from the CP 20 from the signal transmitted by the CO 10. The CO-AFE 43 may then convert the received analog signal into one or more digital signals, which may then be forwarded to the CO-DSP 41 located at the CO 10. Finally, the digital information may be further distributed to one or more specified data sources (not shown) by the CO-DSP 41.

Figure 3:
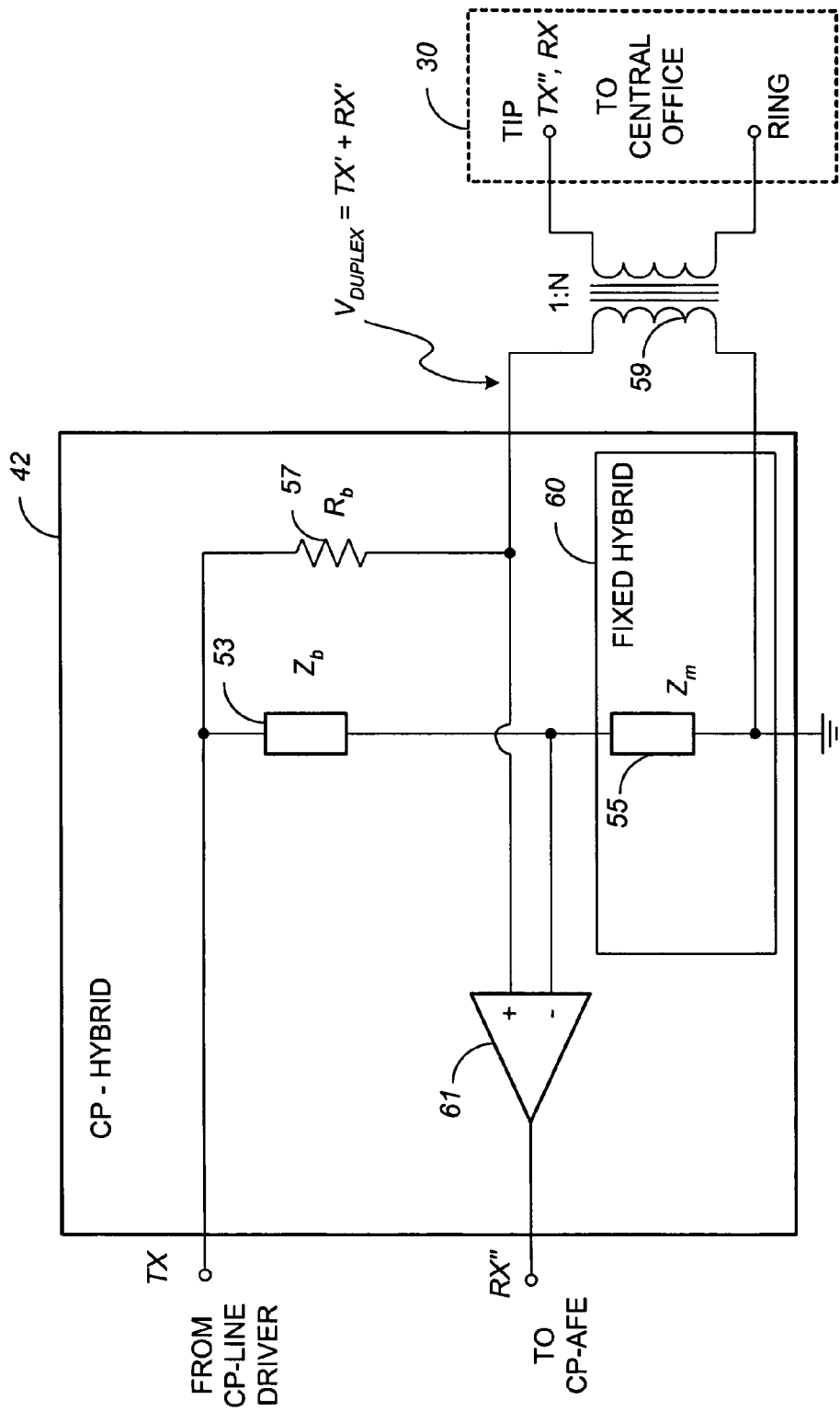
FIG. 3 is a circuit schematic of a conventional hybrid that may be used in the xDSL communication link of FIG. 2.

The xDSL communications link 40 between the line card 18 and the xDSL modem 23, having been briefly described with regard to the functional block diagram of FIG. 2, reference is now directed to FIG. 3. In this regard, FIG. 3 is a circuit schematic illustrating a conventional hybrid 42 in association with an isolation transformer 59 coupled to a twisted-pair telephone transmission line 30. As illustrated in FIG. 3, a transmit signal, TX, may be provided from the CP-line driver 44 (FIG. 2) and applied across a back-matching resistor 57, herein labeled, "$R_b$." As is further illustrated in FIG. 3, impedance and voltage scaling may be performed by coupling the transmit signal, TX', to a two-wire transmission line 30, herein labeled, "TIP" and "RING" via a transformer 59.

As also illustrated in FIG. 3, the transmit signal, TX, may be applied to a scaled voltage divider consisting of a first filter 53, labeled, "$Z_b$," and a fixed hybrid 60. As further illustrated in FIG. 3, the fixed hybrid 60 may comprise a second filter 55, labeled, "$Z_m$." The first filter 53 may be configured such that it emulates a scaled version of the back-matching resistor 57. For example, if the back-matching resistor is implemented with a resistor having a resistance of X Ohms, the first filter 53, $Z_b$, may be implemented such that its equivalent impedance is nX Ohms. Similarly, the second filter 55, $Z_m$, within the fixed hybrid 60, may be configured such that it emulates the sum of the line and load impedances, multiplied by the same scale factor, n.

In a manner well known in the art, the transmit signal, TX', may be echoed across the second filter 55 and may be subtracted from a duplex signal, $V_{DUPLEX}$, comprising the combined receive and transmit signals, RX' and TX', respectively, appearing at the primary of the transformer 59 by a hybrid amplifier 61. As also illustrated in FIG. 3, the output of the hybrid amplifier 61, contains a representation, RAX", of the received signal, RX, from a remotely located transmitter after the transmit signal, TX', has been filtered or removed by the matched voltage divider formed by the first and second filters 53, 55, respectively and the hybrid amplifier 61.

In systems designated for data transmission over metallic transmission lines 30, the line driver amplifier 44 is the power amplifier which delivers the necessary energy to transmit a signal through the transmission line 30 through the back-matching resistor 57. The back-matching resistor 57 serves two purposes. First, the back-matching resistor 57 serves to match the impedance at the end of the transmission line 30. In order to provide a sufficient return loss, a resistor approximately equal to the transmission line's 30 characteristic impedance must terminate the line. Second, the back-matching resistor 57 permits the conventional hybrid 42 to simultaneously receive signals generated from a remote transmitter coupled to the transmission line 30 at the same time the line driver 44 is transmitting. The line driver 44 cannot terminate the transmission line 30 alone because the line driver 44 presents a low load impedance to the remotely transmitted signal, RX. As a result, using a line driver 44 alone would be the equivalent of shunting the remote signal to ground, thus making the receive signal, RX, unrecoverable. The remotely transmitted signal, RX, is recovered by subtracting from the voltage on the transmission line 30 (i.e., the duplex signal) the voltage introduced on the transmission line 30 by the local transmitter, TX'. As shown, the hybrid amplifier 61 performs the task of separating and recovering the remotely transmitted signal (i.e., the received signal, RX) from the transmission line 30.

For simplicity of illustration and description the conventional hybrid circuit of FIG. 3 is depicted in a single-ended configuration. Those skilled in the art will appreciate that in practice a differential and balanced version of the conventional hybrid 42 may be implemented. The conventional hybrid 42 functions properly if the line driver 44 has a very low output impedance. From a data transmission viewpoint, the output of the line driver 44 is an amplified version (i.e., TX') of the transmit signal, TX. This amplified version of the transmit signal, TX', is applied across a voltage divider comprising the back-matching resistor 57 and the primary winding of the transformer 59. As a result, a voltage corresponding to the amplified transmit signal, TX", is present on the primary of the transformer 59.

From a data receive viewpoint, a receive signal, RX, originating at the CO 10 may arrive at the secondary winding of the transformer 59. As is known, a corresponding receive signal voltage, RX', is created via inductance on the primary winding of the transformer 59 and results in a current flowing into the back-matching resistor 57. Since the line driver 44 has a low output impedance, no component of the receive signal, RX', is present at the output of the line driver 44, which leaves only the amplified transmit signal, TX, at the output of the line driver 45. Since the xDSL communication system 1 operates in a substantially linear fashion, superposition applies and the voltage across the primary winding of the transformer 59, $V_{DUPLEX}$ consists of both the receive, RX', and the transmit signals, TX'.

If the first and second filters 53, 55 replicate the voltage divider formed by the back-matching resistor 57 and the primary winding of the transformer 59, then the voltage at the circuit junction between the first and second filters 53, 55 is equivalent to the voltage that would be applied across the transformer primary in the absence of a far end generated receive signal, TX'. As a result, the receive signal, RX, can be recovered by simply taking the difference between the voltage at the primary winding of the transformer 59 and the voltage at the junction between the first and second filters 53, 55. Hence, it is possible to simultaneously transmit and receive.

The conventional hybrid 42 circuit illustrated in FIG. 3 has the additional characteristic that signal components introduced by the line driver 44 are removed by the conventional hybrid 42. In particular, transmit signal components due to imperfections in the line driver 44, such as noise and distortion, are removed by the conventional hybrid 42 and do not get forwarded to the CP-AFE 46 (FIG. 2) with the remotely generated receive signal. This functional aspect of the conventional hybrid 42 is important because high power amplifiers that are used in line drivers are typically responsible for introducing a significant amount of noise and distortion at power levels required for xDSL data transmissions.

The following figures and detailed description describe exemplary architectures and implementations of a combined fixed off-chip portion of a balance network and a programmable adaptive on-chip portion of a balance network that may be selectively applied to the output of the fixed portion of the balance network in an improved front end. Depending on the xDSL application and the twisted-pair loop encountered, the complexity of the fixed and the adaptive portions of the balance network may vary. The adaptation may be directed by a digital signal processor (DSP), which may be programmed to optimize the combined hybrid of the improved front end by using an error criterion generated within the hybrid network. The adaptation may operate during startup, prior to the introduction of the far end receive signal, as well as, during duplex operation. Accordingly, the same algorithms may be used to compensate for environmental changes during operation.

In a preferred embodiment, the improved front end comprises a two part balance network, with a fixed portion enabled via passive non-integrated circuit components and a programmable adaptive portion of the balance network implemented on an integrated circuit via integrated circuit components. The isolation transformer and high-pass filter complicate the impedance to be matched at "low" frequencies, usually below 100 kHz (e.g., ADSL with POTS). That portion of the matching impedance is only very weakly affected by line impedance variations. As a result, a fixed (external) hybrid can address or match the non-variable portion of the effective line impedance. The variable part of the impedance, due mainly to transmission line variations, occurs at higher frequencies, about 80 kHz. The order of the adaptive portion of the balance network may be selected in response to various application and performance issues, such as, but not limited to, power consumption, signal to noise ratio, integrated circuit area available, noise floor requirements, etc.

The variable part of the matching function, due mainly to line impedance variations, is the portion of the matching function which we seek to implement with the variable hybrid portion of the balance network. The variable hybrid therefore comes into play at higher frequencies.

The noise of the hybrid (any hybrid) itself corrupts the receive signal. It is much easier to make an adaptive circuit (on-chip) which has a satisfactory noise level (around 30 nV/root Hz, referred to the ADSL line) when the frequency range is higher rather lower. At the same time, it is easy to make a fixed hybrid (off-chip) to have low-noise even at low frequencies. (Basically, because on-chip capacitance is limited to a few nanoFarads, whereas off-chip capacitors can be large. But the off-chip capacitors are fixed, where as the on-chip or integrated capacitors can be easily implemented as switchable arrays. Furthermore, inductors for the xDSL frequency range are virtually impossible on-chip, but readily available as discrete components, should the external fixed hybrid require them.)

Accordingly, the fixed-variable/external-internal grouping is optimal in several senses. That portion which is easy to make variable is made variable (on-chip), that portion, which does not need to be variable is realized in an easy way externally.

Figure 4:
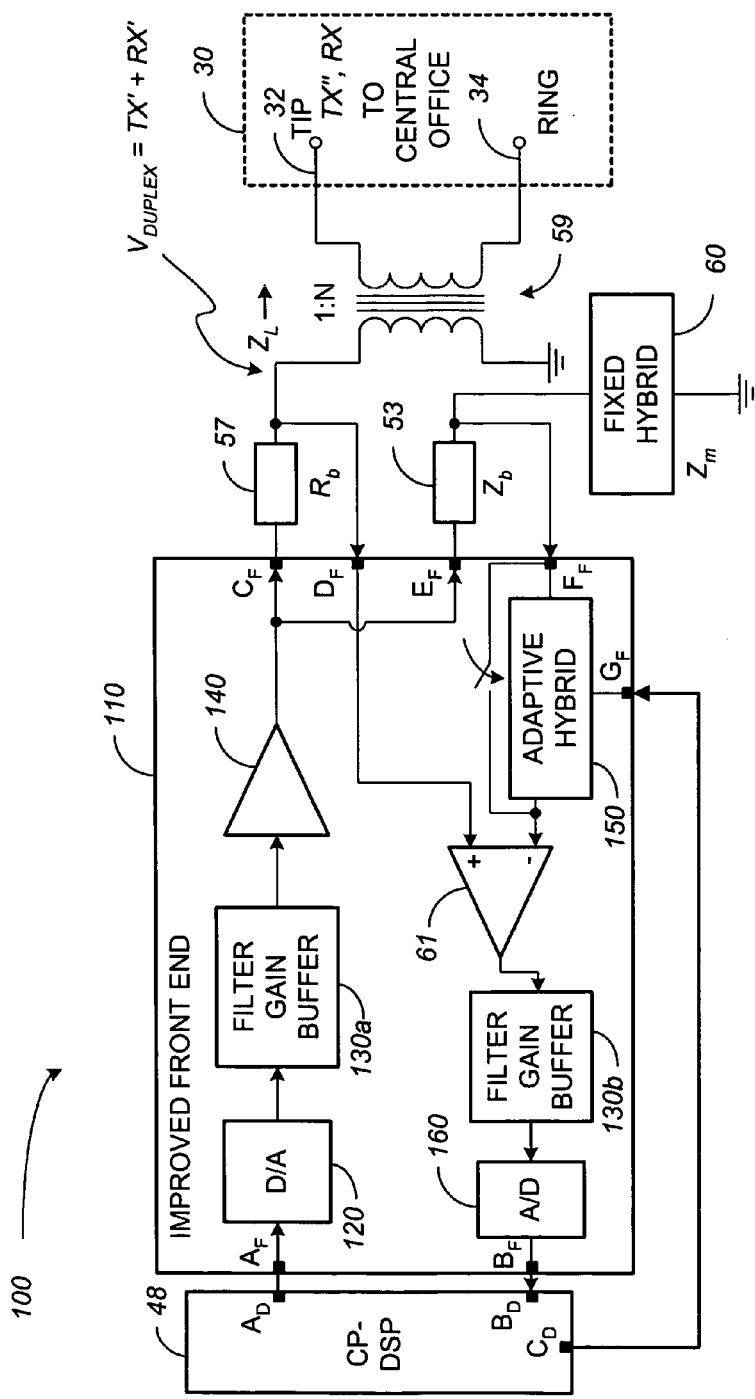
FIG. 4 is a schematic of an improved front end that may be inserted between the DSP and a balanced hybrid.

The fixed-variable/external-internal aspects of a modified hybrid having been generally explained above, reference is now directed to FIG. 4. For simplicity of illustration and description, an improved duplex communication system shown in FIG. 4 is depicted in a single-ended configuration. Those skilled in the art will appreciate that in practice, a differential and balanced version of the improved duplex communication system of FIG. 4 may be implemented. In regard to the single-ended implementation illustrated in FIG. 4, an improved duplex communication system generally denoted by reference number 100 may consist of integrated circuit components and non-integrated discrete circuit components. As shown, a CP-DSP 48 and an improved front end 110 may be implemented on integrated circuits. Conversely, the isolation transformer 59, a back-matching resistor 57, labeled, "$R_b$," a first filter 53, labeled, "$Z_b$," and a fixed hybrid 60, labeled, "$Z_m$" may be implemented via off-chip (i.e., non-integrated circuit components. As previously illustrated and explained with regard to the circuit diagram of FIG. 3, the fixed hybrid 60 may comprise a second filter 55, labeled, "$Z_m$." The fixed hybrid 60 may comprise the fixed portion of the balance network described above.

It should be appreciated that the various non-integrated circuit elements will function as introduced in the circuit illustrated and described in FIG. 3. In this regard, the first filter 53 may be configured such that it emulates a scaled version of the back-matching resistor 57. As explained with regard to FIG. 3, if the back-matching resistor, "$R_b$," is implemented with a resistor having a resistance of X Ohms, the first filter 53, $Z_b$, may be implemented such that its equivalent impedance is nX Ohms. Similarly, the second filter 55, $Z_m$, within the fixed hybrid 60, may be configured such that it emulates the sum of the line and load impedances, multiplied by the same scale factor, n.

It will also be appreciated that the fixed portion of the balance network, labeled, "fixed hybrid" 60, in the circuit diagram of FIG. 4 may be implemented via discrete circuit elements selected to have an impedance that matches a characteristic impedance of the two-wire transmission line 30 together with the transformer 59. As previously described, the characteristic impedance of the combination of the transformer 59 and the two-wire transmission line 30 is fixed by telephone system standards. Inserting the fixed portion of the modified hybrid as illustrated in the circuit diagram of FIG. 4, reduces both the integrated circuit real estate and DSP complexity required in a totally adaptive hybrid circuit.

As illustrated in FIG. 4, the improved front end 110 may be defined by a local transmit path comprising a digital to analog converter 120, a filter gain buffer 130, and a line driver amplifier 140. As further illustrated in FIG. 4, a local transmit signal may be supplied by the CP-DSP 48 at an integrated circuit interface pin labeled, "$A_D$." The improved front end 110 may receive the local transmit signal at an integrated circuit interface pin labeled, "$A_F$." As shown in FIG. 4, the improved front end 110 is configured to receive a digital representation of the desired local transmit signal at interface pin "$A_F$." The digital transmit signal may be converted to an analog signal by the digital to analog converter 120. This analog version of the transmit signal may be filtered and amplified in the filter gain buffer 130 and the line driver amplifier 140.

A local receive signal is generated as explained above. The duplex signal provided at the primary winding of the transformer 59 may be combined with the signal provided by a voltage divider formed by the fixed hybrid 60 (i.e., the fixed portion of the balance network) and the first filter 53, $Z_b$, to recover the remotely generated receive signal. The receive signal may then be further processed in a receive path in the improved front end 110 formed by a receive amplifier 61, a filter gain buffer 130a, and an analog to digital converter 160. As illustrated in the circuit diagram of FIG. 4, the improved front end 110 may be configured to selectively apply an adaptive portion of the modified balance network in the form of an adaptive hybrid 150.

It can be shown that the signal provided at the primary winding of the transformer 59 can be represented by the following equation.

$$VZ_L(jw) = Z_L(jw) \div (R_B + Z_L(jw)), \text{ where } Z_L \text{ is the load impedance.} \qquad \text{Eq. 1}$$

It can be further shown that the signal at the voltage divider formed by the fixed hybrid 60, $Z_m$, and the first filter 53, $Z_b$, can be represented as:

$$VZ_m(jw) = Z_m(jw) \div (Z_B + Z_m(jw)) \qquad \text{Eq. 2}$$

For those cases where the adaptive filter 150 is selectively applied, the signal effectively removed by the receive amplifier 61 may be represented as:

$$VZ_m'(jw) = Ha(jw) * VZ_m(jw) \text{ or}$$

$$VZ_m'(jw) = Ha(jw) * VZ_L(jw) + (R_B + Z_L(jw)). \qquad \text{Eq. 3}$$

It will be appreciated that perfect local transmit signal echo rejection can be achieved if $RX = VZ_L(jw) - VZ_m'(jw) = 0$ holds for a negligible signal received from a remote transceiver.

For those situations where the adaptive hybrid 150 is applied, additional filtering and amplification may be provided within a receive path formed by a receive amplifier 61, a filter gain buffer 130b, and an analog to digital converter 160. The digital representation of the recovered receive signal, RX, may be provided to the CP-DSP 48 via an integrated circuit interface formed by integrated circuit pins labeled, "$B_F$" and "$B_D$."

As further illustrated, the CP-DSP 48 may close a control loop back to the adaptive portion of the balance network (i.e., the adaptive hybrid 150) via a control interface formed by integrated circuit pins labeled, "$C_D$" and "$G_F$." Preferably, the CP-DSP 48 provides filter coefficients according to a minimization criterion. Depending upon the particular xDSL application and the twisted-pair transmission line 30 encountered, transfer function poles, zeros, or poles and zeros of the transfer function may be modified. In practice, a pole or zero modification can be realized by a change in the various resistor, capacitor, or transconductance values of the elements selected to implement the adaptive hybrid 150. It should be appreciated that a digital memory device may provide these element values to the CP-DSP 48.

Figure 5:
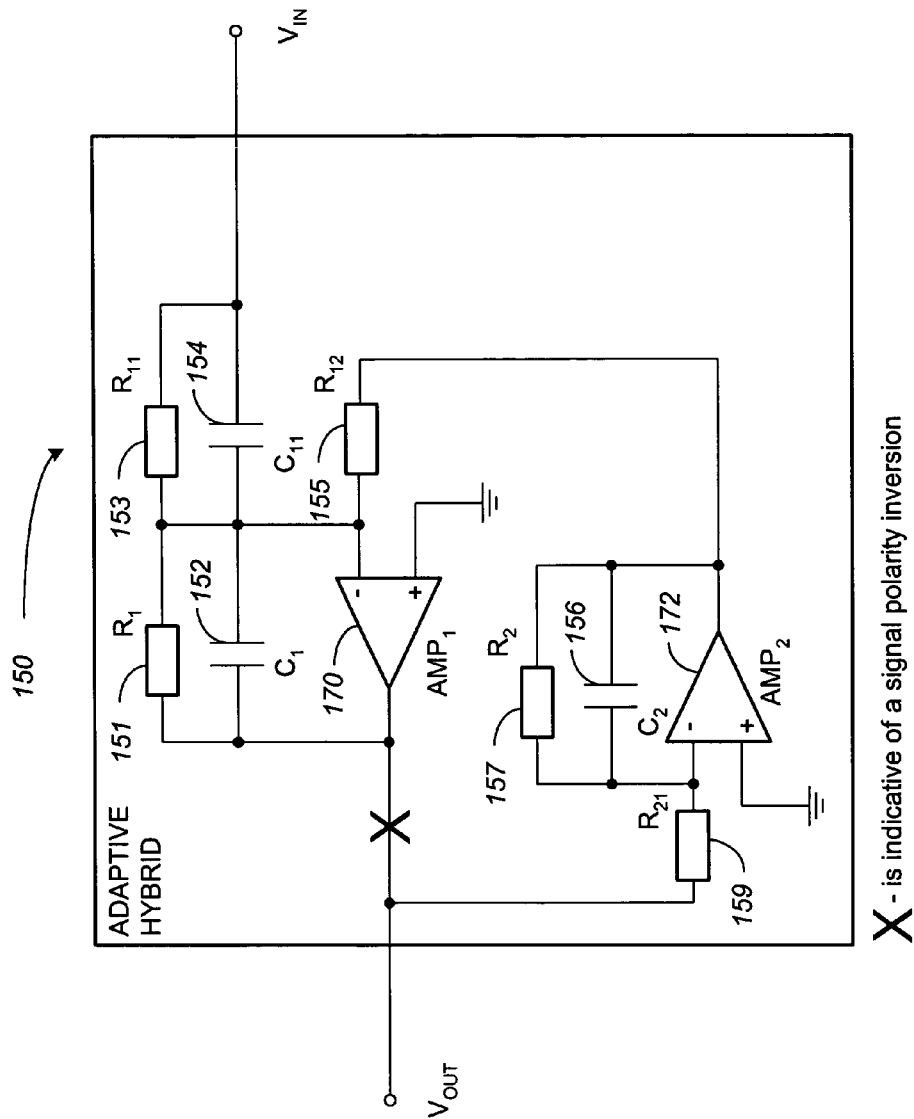
FIG. 5 is a circuit schematic of an exemplary adaptive hybrid that may be used in the improved front end of FIG. 4.

FIG. 5 illustrates an exemplary second order adaptive filter that may be used to implement the adaptive hybrid 150 in the circuit of FIG. 4. It should be appreciated that the adaptive hybrid 150 represents that portion of the balance network that may be adjusted in response to environmental changes on the twisted-pair transmission line 30, as well as, in applications where one or more bridged taps are present on the transmission line. In this regard the adaptive hybrid 150 may comprise a first amplifier 170 and a second amplifier 172. As illustrated in the circuit diagram of FIG. 5, each of the amplifiers 170 and 172 may be associated with a plurality of adjustable components. Here, the adjustable components take the form of resistors and capacitors.

As illustrated in FIG. 5, an input voltage, $V_{IN}$ comprising the signal provided by the voltage divider formed by the fixed hybrid 60, $Z_m$, and the first filter 53, $Z_b$, may be supplied to a parallel combination of a resistor 153, labeled, $R_{11}$, and a capacitor 154, labeled, $C_{11}$. The opposite junction of the parallel combination formed by the resistor 153 and the capacitor 154 may be coupled to a second parallel combination formed by a resistor 151, labeled, $R_1$, and a capacitor 152, labeled, $C_1$, as well as, the negative input to the first amplifier 170. The opposite junction of the parallel configuration formed by the resistor 151 and the capacitor 152 may be coupled to the output of the first amplifier 170, as well as, an output of the adaptive hybrid, labeled, $V_{OUT}$.

The output of the adaptive hybrid, $V_{OUT}$, may also be coupled to a resistor 159, labeled, $R_{21}$, in series with the negative input of the second amplifier 172. The negative input of the second amplifier 172 may be further coupled to a parallel combination of a resistor 157, labeled, $R_2$, and a capacitor 156, labeled, $C_2$. The opposite junction of the parallel configuration formed by the resistor 157 and the capacitor 156 may be coupled to the output of the second amplifier 172, as well as, a resistor 155, labeled, $R_{12}$, in series with the negative input of the first amplifier 170. As further shown in the circuit schematic of FIG. 5, the positive inputs of the first and second amplifiers 170, 172 may be coupled to signal ground.

It can be shown that the second order filter provided in the circuit schematic illustrated in FIG. 5 can be modeled by a transfer function T(s) as in the equation below:

$$T(s) = \frac{C_{11}}{C_1} \cdot \frac{1/(C_2 * C_{11} * R_2 * R_{11}) + s*(C_2 R_2 + C_{11} R_{11})/(C_2 * C_{11} * R_2 * R_{11}) + s^2}{\frac{1 + R_1 * R_2/R_{12}/R_{21}}{C_1 * C_2 * R_1 * R_2} + s * \frac{C_2 R_2 + C_1 R_1}{C_1 * C_2 * R_1 * R_2} + s^2} \qquad \text{Eq. 4}$$

Furthermore, it can be shown that the second order transfer function, T(s), is equivalent to:

$$T(s) = \frac{\omega z^2 + \omega z/qz * s + s^2}{\omega p^2 + \omega p/qp * s + s^2}, \qquad \text{Eq. 5}$$

where, ωp denotes a pole frequency, ωp denotes a pole quality factor, and ωp denotes a zero frequency, qz denotes a zero quality factor, and s is the complex frequency jw. A direct correspondence between the magnitude of the various resistance and capacitance values selected for the circuit elements in Equation 4 above to the poles and zeros of the simplified transfer function of Equation 5, indicates that manipulating the magnitudes of the various resistors and capacitors in the circuit illustrated in FIG. 5 will result in a corresponding manipulation of the poles and zeros of the transfer function in the complex plane.

It should be appreciated that various other devices may be used to selectively modify the transfer function of the adaptive hybrid 150. For example, integrated circuit elements with known transconductance values may be used in an alternative implementation. By way of further example, gyrator simulations of circuit element inductances may be implemented on a DSP to emulate various portions of the filter as will be appreciated by those skilled in the art.

Figure 6:
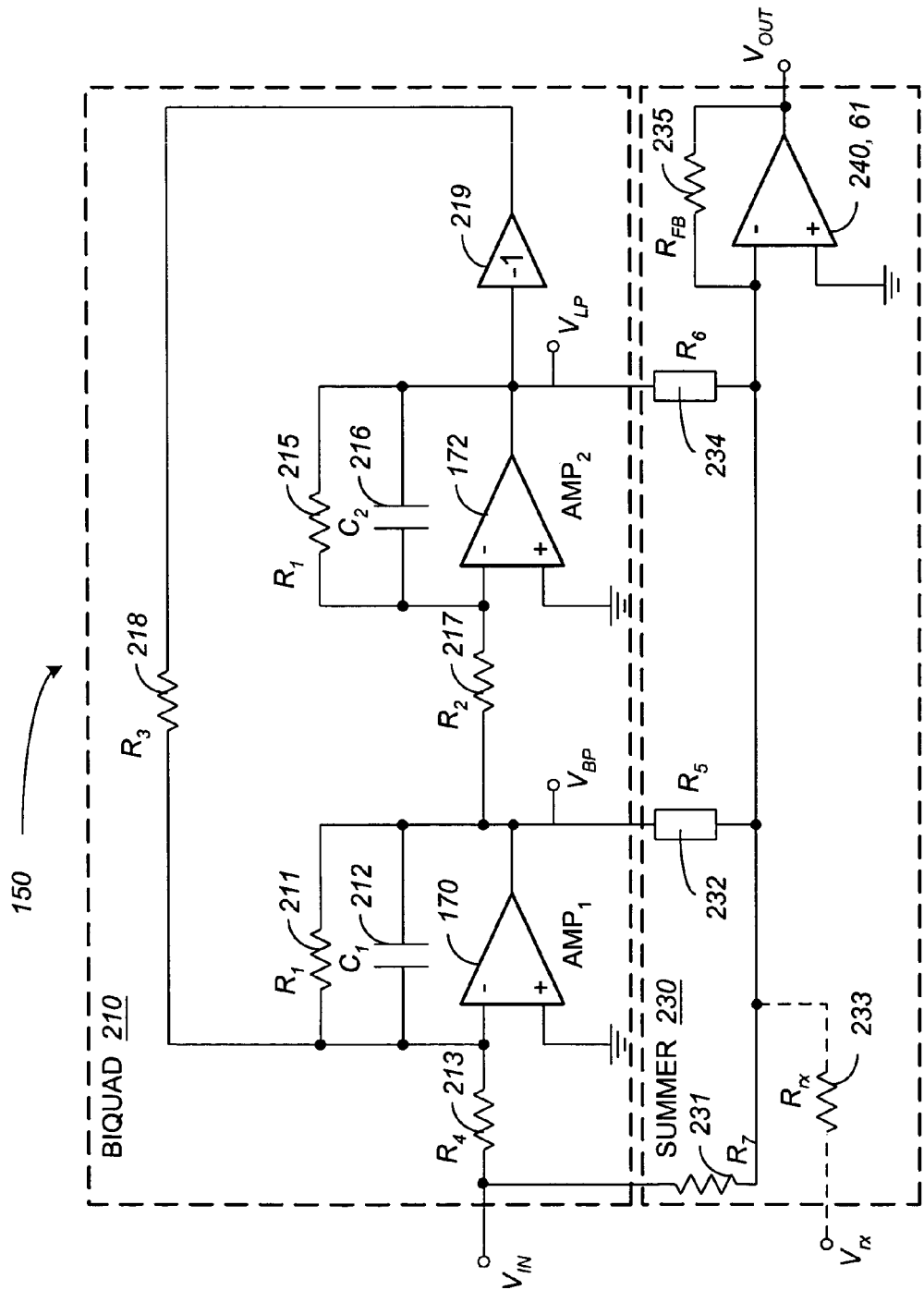
FIG. 6 is an alternative schematic of the adaptive hybrid of FIG. 4.

Reference is now directed to FIG. 6, which illustrates an alternative circuit that may be used to implement the adaptive hybrid 150 in the circuit of FIG. 4. It should be appreciated that the adaptive hybrid 150, as in the circuit diagram of FIG. 5, represents that portion of the balance network that may be adjusted in response to environmental changes on the twisted-pair transmission line 30, as well as, in applications where one or more bridged taps are present on the transmission line. In this regard, the adaptive hybrid 150 may be implemented on an application-specific integrated circuit (ASIC) and may comprise a biquad 210 and a summer 230. Although the adaptive hybrid 150 is shown in a single-ended configuration, preferably the biquad 210 and the summer 230 are implemented in a differential, fully balanced version of the circuit illustrated in FIG. 6.

As illustrated in the circuit diagram of FIG. 6, the adaptive hybrid 150 may be described as a two-input single-output device. In this regard, the adaptive hybrid 150 receives a first input $V_{IN}$, which represents the filtered output of the external or fixed portion of the hybrid (i.e., the fixed hybrid 60 in FIG. 4) and a second input $V_{rx}$, which represents a scaled version of the duplex signal containing both the transmit signal and the desired remotely generated receive signal. In response, the adaptive hybrid 150 generates $V_{OUT}$, a replica of the desired receive signal.

The biquad 210 is a well-known circuit that was first used with analog computers. The biquad 210 consists of two integrators, formed by inverting operational amplifiers with capacitive feedback. In this regard, the first integrator is formed by the circuit defined by Amp 170, capacitor 212, $C_1$, and resistor 211, $R_1$. The second integrator is formed by the circuit defined by Amp 172, capacitor 216, $C_2$, and resistor 215, $R_1$. As illustrated in the circuit diagram of FIG. 6, the first and second integrators may be coupled via a resistor 217. As also illustrated in FIG. 6, the first and second integrators are enclosed in a feedback loop. In order to make the feedback loop negative, an odd number of inversions is present in the loop. Preferably, a generic inverting buffer 219 is inserted in the feedback loop between the output of the second integrator and the input of the first integrator. As shown a resistor 218 may also be inserted in the feedback loop.

Note that if the adaptive hybrid 150 were implemented in a single-ended circuit configuration, a third operational amplifier would be required to accomplish the inversion. However, since the circuits forming the adaptive hybrid 150 are implemented in a balanced differential configuration, the signal inversion can be accomplished without adding an operational amplifier by swapping the polarities of the differential outputs of the second integrator at an appropriate point. As a result, only two amplifiers are needed in the biquad 210.

As further illustrated in the circuit of FIG. 6, the biquad 210 has two outputs, $V_{BP}$, a band pass output voltage and $V_{LP}$, a low pass output voltage. A routine analysis of the biquad 210 reveals that the two output voltages may be represented by the following functions.

$$\frac{V_{BP}}{V_{IN}}(s) = -\frac{R_1}{R_4}\frac{\omega_p}{q_p}\frac{s}{s^2+\frac{\omega_p}{q_p}s+\omega_p^2}, \text{ and} \qquad \text{Eq. 6}$$

$$\frac{V_{LP}}{V_{IN}}(s) = -\frac{R_3}{R_4}\frac{\omega_p^2}{s^2+\frac{\omega_p}{q_p}s+\omega_p^2}, \text{ with} \qquad \text{Eq. 7}$$

$$\omega_p = \frac{1}{\sqrt{R_2R_3C_1C_2}} \text{ and} \qquad \text{Eq. 8}$$

$$q_p = R_1\sqrt{\frac{C_1}{R_2R_3C_2}}. \qquad \text{Eq. 9}$$

The two biquad outputs, $V_{BP}$, and $V_{LP}$, may be applied to the summer 230 as shown in the alternative implementation of the adaptive hybrid 150. Preferably, the transfer function of the adaptive hybrid 150 is neither a band pass nor low pass, but rather a notch emphasizing or all pass function. As shown, the summer 230 consists of a first resistor 231, $R_7$, a second resistor 233, $R_{rx}$, a feedback resistor 235, $R_{FB}$, as well as, a first impedance 232 ($R_5$) and a second impedance 234 ($R_6$), and an amplifier 240. The various components arranged in the summer 230 as shown, serve to combine the output of the fixed hybrid 60 (i.e., $V_{IN}$), and the biquad outputs, $V_{BP}$ and $V_{LP}$ in a suitable relative strength and phase. As a result, the output of the fixed hybrid 60 is filtered through a biquadratic function.

Since the adaptive hybrid 150 is actually implemented as a differential circuit, the first and second impedances 232 and 234, respectively, can be implemented by means of a polarity inversion (i.e., a polarity cross). As a result, the first and second impedances 232, 234 can be either regular resistive elements, or, in effect, negative resistors in a single-ended circuit representation. Hence, the resistive elements are shown and described with regard to the circuit of FIG. 6 as impedances. The feedback resistor 235, $R_{FB}$, scales the output signal, $V_{OUT}$, without affecting the frequency dependence of the output, i.e., it serves as a simple gain regulator. The behavior of the adaptive hybrid 150 can be described by the following transfer function:

$$\frac{V_{OUT}}{V_{IN}}(s) = -\frac{R_{FB}}{R_7}\frac{s^2+s\frac{\omega_p}{q_p}\left(1-\frac{R_7}{R_5}\frac{R_1}{R_4}\right)+\omega_p^2\left(1+\frac{R_7}{R_6}\frac{R_3}{R_4}\right)}{s^2+\frac{\omega_p}{q_p}s+\omega_p^2}. \qquad \text{Eq. 10}$$

Those skilled in the art will appreciate that equation 10 is a general second order transfer function. Since $R_5$ and $R_6$, the first and second impedances 232, 234 can be effectively negative, the adaptive hybrid 150 can be adjusted to realize any arbitrary second order function. It should be further appreciated that the adjustments may be realized by replacing each of the resistive and capacitive circuit elements illustrated in the circuit of FIG. 6, with a switched array of sub-components to vary the effective resistance, capacitance, and/or impedance (as in the case of $R_5$ and $R_6$) between the operational amplifiers 170, 172 and the various inputs and outputs of the adaptive hybrid 150.

For example, the capacitors $C_1$ 212 and $C_2$ 216 may be implemented by a bank of integrated elements each having a unit capacitance. For integrated circuit area efficiency, the unit capacitances may vary across a wide range of realizable capacitances. Those skilled in the art will appreciate the various series and parallel combinations of the various unit capacitances may be accessed by way of switches to vary the effective capacitance seen between terminals of the adaptive hybrid 150. Similarly, the resistors 211, 213, 215, 217, 218, 231, 233, and 235 may be implemented by a bank of integrated circuit elements having a unit resistance. As in the case of the capacitors, those skilled in the art will appreciate the various circuit combinations that may be controllably accessed by way of a plurality of suitably located switches to permit external control of the adaptive hybrid 150. The impedances 232 and 234 ($R_5$ and $R_6$) may be implemented as with the resistors 211, 213, 215, 217, 218, 231, 233, and 235 by a bank of integrated circuit elements having a unit resistance. In the case of the impedances 232 and 234, additional switches and control inputs may be supplied to "cross" and/or "uncross" the differential signal conductors.

The biquad 210 of FIG. 6 can produce a single transfer function characterized by a frequency notch or peak. Even though transmission line irregularities in the form of bridged taps often produce a plurality of notches in the received spectrum, there is typically one dominant notch or range of frequencies where the phase of the echo signal reverses or nearly reverses. If this dominant notch is not corrected, often the hybrid will completely fail to suppress the transmit signal echo. In some situations, i.e., a phase inversion, the hybrid may end up amplifying rather than suppressing the transmit signal. The remaining notches created by bridged taps are typically too "shallow" to affect the hybrid and may be ignored. Compensating for the dominant notch substantially reduces the total transmit echo power observed in the receive path, thereby permitting a higher receive amplifier gain along with its associated benefits.

Consider now that the function of a standard hybrid amplifier 61 is to subtract the replicated echo signal from the duplex signal containing both the receive signal and the transmit signal. In other words, $V_{OUT}$, would be subtracted from the duplex signal. Here, that subtraction can be performed without the addition of another amplifier by taking advantage of the summer 230 provided in the adaptive hybrid 150. Rather than supply $V_{OUT}$ to the hybrid amplifier 61, the hybrid amplifier 61 can be used as the summing amplifier 240, which adds the duplex signal, $V_{rx}$, the signal from the external hybrid, VIN, and the two outputs from the biquad 210 (i.e., $V_{BP}$ and $V_{LP}$). The duplex signal can simply be added as another input to the summing amplifier 240 as illustrated by the dashed line in the circuit if FIG. 6. Viewed in another way, rather than filtering the output of the external (fixed) hybrid 60 first and then supplying the output to the hybrid amplifier, the biquad 210 can be used to generate additional signal components (i.e., $V_{BP}$ and $V_{LP}$), and supply those additional components to the summing amplifier 240, which can serve as the hybrid amplifier 61.

The circuit arrangement illustrated in FIG. 6 has an important advantage when compared to other conceivable implementations. Note that the full extent of the signal provided by the fixed portion of the hybrid is not processed through an active filter (i.e., the biquad 210). The majority, or at least a significant portion of the signal enters the hybrid amplifier 61 (a.k.a., the replacement summing amplifier 240) through $R_7$ (i.e., resistor 231) alone. The fact that only a small portion of the signal being summed by the hybrid amplifier 61 is taken from the biquad 210 means that the biquad 210 does not have to exhibit the noise and distortion performance required for outright pre-hybrid processing. This fact makes an ASIC adaptive hybrid 150 feasible with acceptable power dissipation and total capacitance.

The final replica echo signal (i.e., total output of the hybrid network consisting of the fixed hybrid 60 and the adaptive hybrid 150) is never actually created, rather its signal components (i.e., the signals supplied through $R_7$, $R_5$ and $R_6$) are weighted and subtracted from the receive signal in a single operation at the summer amplifier 240 (functionally the receive/hybrid amplifier 61). The output of the (total) hybrid never exists as a separate signal. Summing the "echo" components separately would be a problematic operation due to the required linearity and noise levels of such a summer. When the echo components are directly summed (subtracted) with the duplex signal, the result is a relatively small signal (i.e., the receive signal alone), so the performance requirements on the summer amplifier 240 are much more relaxed.

In the circuit arrangement of FIG. 6, the only amplifier components through which the "entire" echo signal passes at some point are the biquad amplifiers 170, 172. Because they are mere voltage followers, it is possible to implement them with the required noise and linearity. Strictly speaking, they are not actually required if the external (fixed hybrid 60) part of the hybrid can operate when loaded by $R_4$ and $R_7$.

It should be appreciated by those skilled in the art that conceivably, there could be additional biquad "resonators", connected in the same way (i.e., with more impedances or resistors similar to $R_5$ and $R_6$ coupled to the summing amplifier 240 to better compensate for multiple bridged taps or other line impedance effects.

Figure 7:
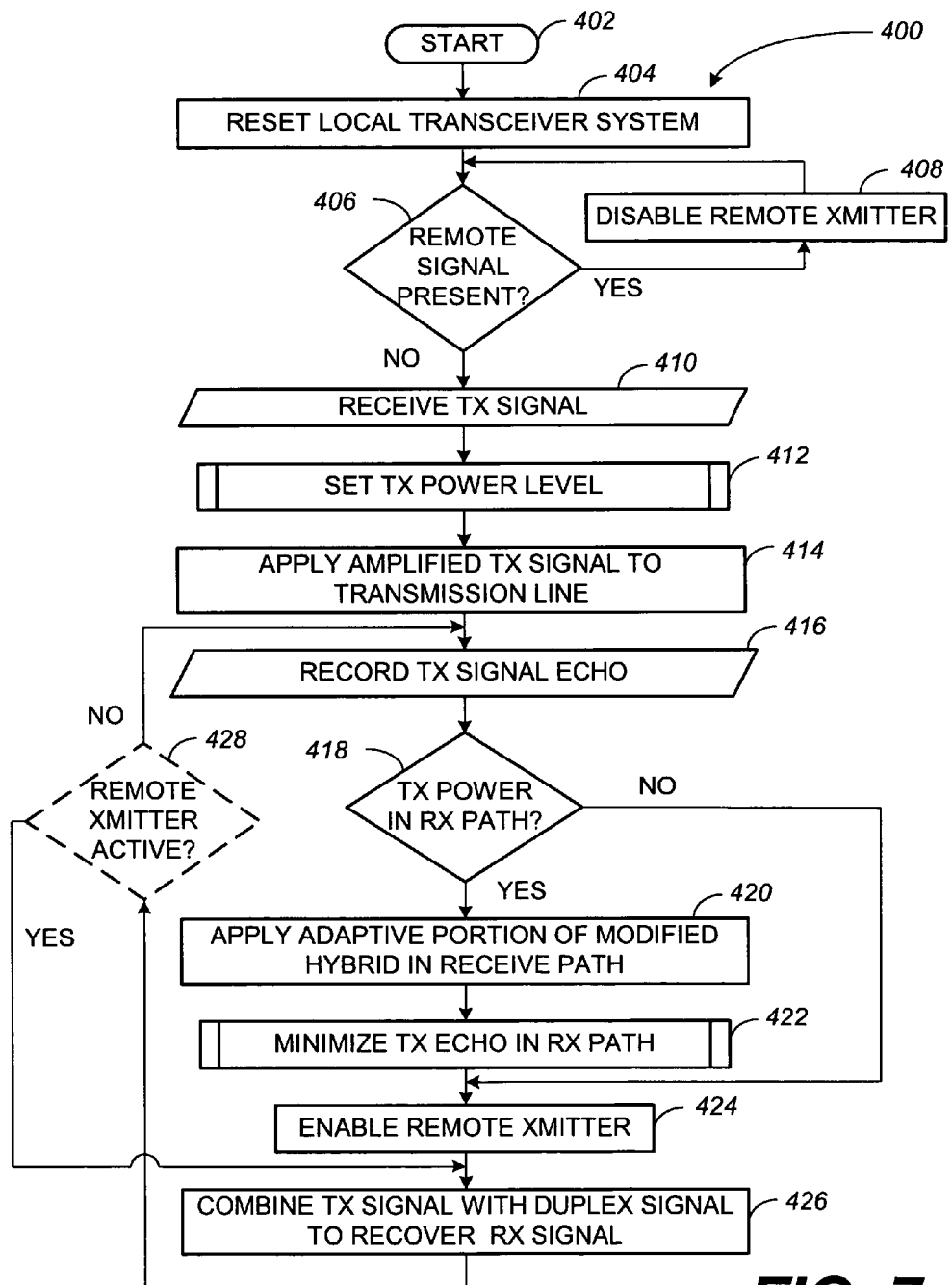
FIG. 7 is a flowchart highlighting an improved method for configuring a local transceiver to minimize the transmit power required at a remote transmitter in a duplex communication that may be performed by the improved front end of FIG. 4.

An alternative embodiment of the adaptive hybrid 150, having been described, reference is now directed to FIG. 7, which presents a flowchart highlighting a method for configuring a local transceiver to minimize the transmit power required at a remote transmitter. In this regard, method for configuring a local transceiver 400 may begin with step 402, labeled, "Start." The method for configuring a local transceiver 400 may be configured to first reset the local transceiver system as indicated in step 404. The transceiver reset may set the transceiver to a predetermined initialization or default state. For example, the adaptive portion of the balance network comprising the modified hybrid (i.e., the adaptive hybrid 150) may be bypassed by opening a switch. It will be appreciated that the default state may be defined as an optimum configuration responsive to the particular xDSL application and/or previously determined characteristics of the transmission line 30 and the transformer 59. It will be further appreciated that present line impedance characteristics can be corrected by enabling the line driver of the local transceiver (physically, or in computation), transmitting over the entire band over which the improved hybrid 150 is to operate well, and adjusting the adaptive components so as to minimize the energy of the echo. In addition, the adaptive components may be varied so as to ensure that the echo spectrum is reasonably flat with no excessive peaks through the band where the hybrid is designated to operate. The adjustment may take the form of a generic gradient descent algorithm or other similar search algorithm to identify the optimum configuration of the variable components.

In this particular example, the local transmitter is disabled as part of the transceiver initialization. It should be appreciated that it is not necessary to remove the local transmitter to configure the local transceiver to minimize transmit power requirements at the remote transmitter.

Next, as indicated in step 406, the method for configuring a local transceiver 400 may perform a check to determine if the remote transmitter is active. If a remotely generated signal is present as shown in the flowchart of FIG. 7, the method for configuring a local transceiver 400 is configured to disable the remote transmitter as shown in step 408. Once it is confirmed that the remote transmitter is disabled, processing may continue with step 410, where the local transceiver receives a signal designated for transmission to the remote transceiver.

In accordance with a predetermined process, the method for configuring a local transceiver 400 may be configured to set the transmit signal power level as shown in step 412. It will be appreciated that other transmit signal characteristics may be selectively modified in accordance with the desired xDSL transmission signal standards. After configuring the transmit signal, the method for configuring a local transceiver 400 may be configured to apply the transmit signal to the transmission line 30 (FIG. 4) as illustrated in step 414. The application of the transmit signal to the transmission line 30 may be performed via the voltage dividers and the fixed portion of the modified balance network as previously explained.

Next, the method for configuring a local transceiver 400 may record various parameters of the local transmit signal echo present in the receive channel as indicated in step 416. If it is determined by the query in step 418 that an undesirable transmit signal echo is present in the receive path, the method for configuring a local transceiver 400 may be configured to apply the adaptive portion of the balance network as shown in step 420. With both the fixed and the adaptive portions of the balance network coupled in the receive path of the improved front end 100 (FIG. 4), various elements within the adaptive hybrid 150 may be adjusted and the resulting transmit signal echo in the receive path monitored to minimize the transmit signal echo present in the receive path as indicated in step 422.

It should be appreciated that the minimization process of step 422 may entail a brute force algorithm that selectively adjusts each of the variable devices of the adaptive hybrid 150, records the combination applied, and associates various characteristics of the transmit signal echo with the configuration. Each of the available configurations may be applied and the transmit signal echo monitored, in order to identify the combination that results in an optimal solution. In alternative embodiments, the minimization process of step 422 may be implemented using well-known algorithms, such as but not limited to, a steepest descent algorithm or a recursive least squares (RLS) algorithm. Once a solution has been selected and applied to the adaptive hybrid 150, the method for configuring a local transceiver 400 may proceed to send a signal that may initiate the remote transceiver to enable the remote transmitter as indicated in step 424. As previously described with regard to the improved front end of FIG. 4, the combination of the local and remote transmit signals may simultaneously exist on the transmission line 30. As indicated in step 426, a combination of the local transmit signal with the duplex signal can be used to recover the remote signal transmission.

When the local transceiver is functioning in an operational mode, the method for configuring a local transceiver 400 may periodically perform the optional query illustrated in step 428. In this regard, the transceiver may be configured to periodically check if the remote transmitter is enabled. In an alternative embodiment, the transceiver may perform the query of step 428 in response to a locally generated signal indicative of an adverse condition in the receive path. In another alternative, the query of step 428 may be initiated by a remotely generated signal from the remote transceiver indicating that it is about to terminate signal transmission. It should be appreciated that the aforementioned alternatives for initiating the query of step 428 may be implemented separately or in combination.

When it is determined that the remote transmitter is not actively transmitting, the transceiver may be configured to repeat steps 416 through 422 to compensate for environmental changes along the transmission line 30. Otherwise, if the query of step 428 indicates that the remote transmitter is active, the transceiver may be configured to remain in an operational mode as indicated by the flow control arrow associated with the affirmative branch from the query of step 428. It will be appreciated that any suitable process step for aborting and or ending the method for configuring a local transceiver 400 may be inserted between steps 416 and 428.

Figure 8:
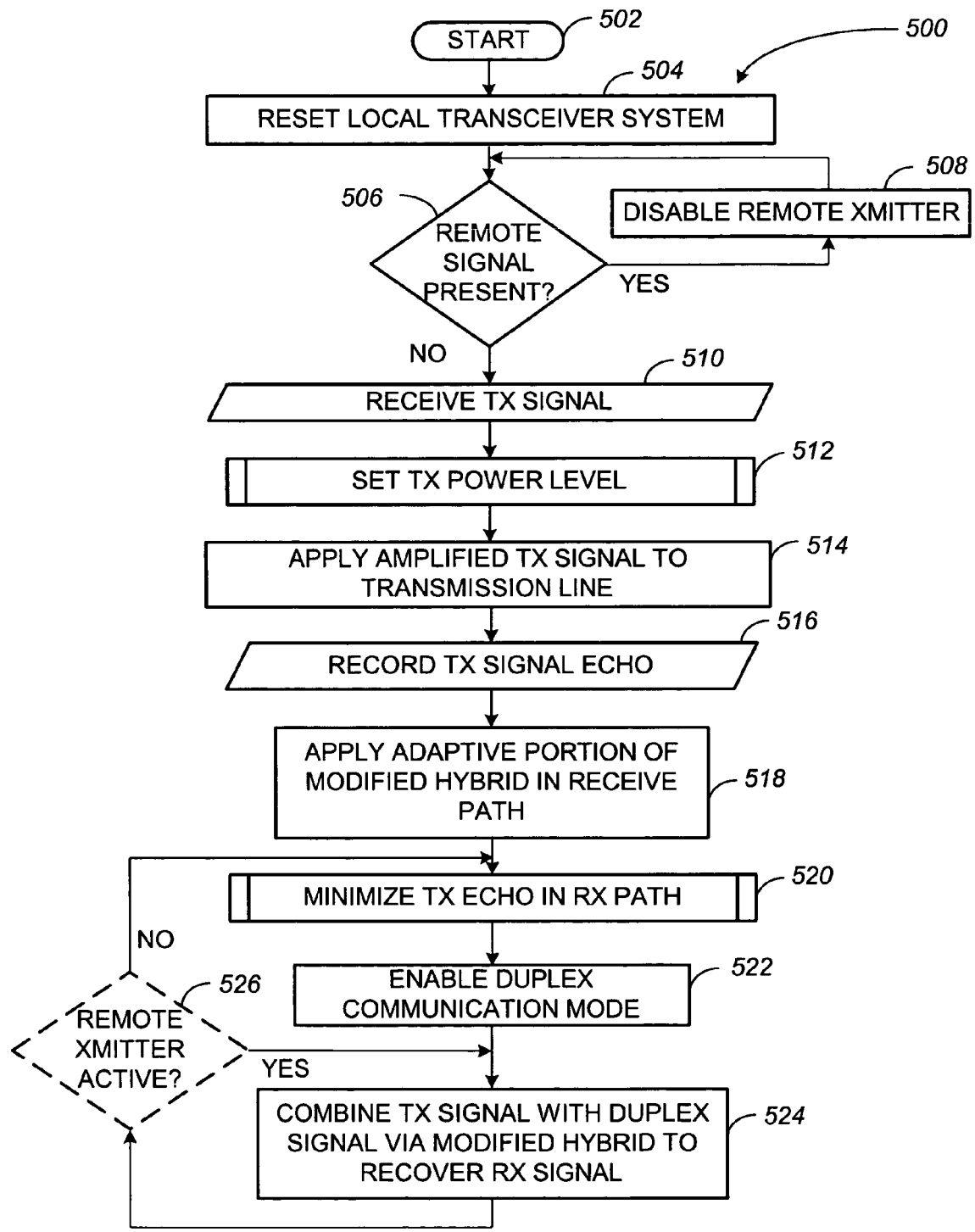
FIG. 8 is a flowchart highlighting an improved method of filtering a transmit signal from a duplex signal transmission that may be implemented by the improved front end of FIG. 4.

Reference is now directed to the flowchart illustrated in FIG. 8. In this regard, a method for recovering a remotely generated signal 500 from a transmission line in a duplex communication system is disclosed. The method for recovering a remotely generated signal 500 may begin with step 502, labeled, "Start." The method for recovering a remotely generated signal 500 may be configured to first reset the local transceiver system as indicated in step 504. The transceiver reset may set the transceiver to a predetermined initialization or default state. As described above with regard to the method for configuring a local transceiver 400, the adaptive portion of the balance network comprising the adaptive hybrid 150 (FIG. 4) may be bypassed by opening a switch. It will be appreciated that the default state may be defined as an optimum configuration responsive to the particular xDSL application and/or previously determined characteristics of the transmission line 30 and the transformer 59.

Next, as indicated in step 506, the method for recovering a remotely generated signal 500 may perform a check to determine if the remote transmitter is active. If a remotely generated signal is present as shown in the flowchart of FIG. 8, the recovering a remotely generated signal 500 is configured to disable the remote transmitter as shown in step 508. Once it is confirmed that the remote transmitter is disabled, processing may continue with step 510, where the local transceiver receives a signal designated for transmission to the remote transceiver.

In accordance with a predetermined process, the method for recovering a remotely generated signal 500 may be configured to set the transmit signal power level as shown in step 512. It will be appreciated that other transmit signal characteristics may be selectively modified in accordance with the desired xDSL transmission signal standards. After configuring the transmit signal, the method for recovering a remotely generated signal 500 may be configured to apply the transmit signal to the transmission line 30 (FIG. 4) via the fixed portion of a balance network hybrid as indicated in step 514. The application of the transmit signal to the transmission line 30 may be performed via the voltage dividers and the fixed portion of the modified balance network.

Next, the method for recovering a remotely generated signal 500 may record various parameters of the local transmit signal echo present in the receive channel as indicated in step 516. If it is determined by the query in step 516 that an undesirable transmit signal echo is present in the receive path, the method for recovering a remotely generated signal 500 may be configured to apply the adaptive portion of the balance network as shown in step 518. With both the fixed and the adaptive portions of the balance network coupled in the receive path of the improved front end 100 (FIG. 4), various elements within the adaptive hybrid 150 may be adjusted and the resulting transmit signal echo in the receive path monitored to minimize the transmit signal echo present in the receive path as indicated in step 520.

It should be appreciated that the minimization process of step 520 may entail a brute force algorithm, a steepest descent algorithm, or a recursive least squares (RLS) algorithm. Once a solution has been selected and applied to the adaptive hybrid 150, the method for recovering a remotely generated signal 500 may proceed to send a signal that may initiate the remote transceiver to enable the remote transmitter as indicated in step 522. As previously described with regard to the improved front end of FIG. 4, the combination of the local and remote transmit signals may simultaneously exist on the transmission line 30. As indicated in step 524, a combination of the local transmit signal with the duplex signal via the modified hybrid can be used to recover the remote signal transmission.

When the local transceiver is functioning in an operational mode, the method for recovering a remotely generated signal 500 may periodically perform the optional query illustrated in step 526. In this regard, the transceiver may be configured to periodically check if the remote transmitter is enabled. In an alternative embodiment, the transceiver may perform the query of step 526 in response to a number of locally generated and remotely generated indicators as previously described.

When it is determined that the remote transmitter is not actively transmitting, the transceiver may be configured to repeat steps 520 through 524 to compensate for environmental changes along the transmission line 30. Otherwise, if the query of step 526 indicates that the remote transmitter is active, the transceiver may be configured to remain in an operational mode as indicated by the flow control arrow associated with the affirmative branch from the query of step 526. As with the method illustrated in FIG. 7, the method for recovering a remotely generated signal 500 may be aborted or terminated by any of a number of suitable steps inserted just prior to step 524.

It is significant to note that the method for configuring a local transceiver 400 presented in FIG. 7 and the method for recovering a remotely generated signal 500 presented in FIG. 8 are by way of example only. In the examples presented, which are intended to be non-limiting examples, each of the functions introduced and described in the flowcharts of FIGS. 7 and 8 may be implemented by the improved front end 100 in various embodiments. Furthermore, the methods contain a number of processing steps that may be implemented in firmware and executed by the CO-DSP 43 (FIG. 4).

It should be appreciated that each of the processing steps in the method for configuring a local transceiver 400 and the method for recovering a remotely generated signal 500 illustrated in the flowcharts of FIGS. 7 and 8, respectively, may be implemented via an ordered list of executable instructions for implementing logical functions. This ordered list of executable instructions, can be embodied in any computer readable medium for use by, or in connection with, an instruction execution system, apparatus, or device such as a computer based system, processor containing system, or other systems that can fetch the instructions from the instruction execution system, apparatus, or device and execute the instructions. In the context of this document, a "computer readable medium" can be any means that can contain, store, communicate, propagate or transport the program for use by or in connection with the instruction execution system, apparatus or device. The computer readable medium can be, for example, but not limited to, an electronic, magnetic, optical, electromagnetic, infrared or semiconductor system, apparatus, device, or propagation medium. More specific examples (a non-exhaustive list) of the computer readable medium would include the following: an electrical connection (electronic) having one or more wires, a portable computer diskette (magnetic), a random access memory (RAM) (magnetic), a read only memory (ROM) (magnetic), an erasable program read only memory (EPROM or flash memory) (magnetic), an optical fiber (optical), and a portable compact disk read only memory (CDROM) (optical). Note that the computer readable medium could even be paper or another suitable medium upon which the program is printed, as the program can be electronically captured, via for instance, optical scanning of the paper or other medium, then compiled, interpreted or otherwise processed in a suitable manner, if necessary, and then stored in a computer memory.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the present invention and protected by the following claims.

Therefore, having thus described the invention, at least the following is claimed:

1. A modified hybrid for an analog front end, comprising:
   a fixed portion configured to match an effective impedance of a transmission line as seen at the analog front end and to generate a filtered replica of a local transmit signal; and
   an adaptive portion containing a plurality of controllable circuit elements arranged to form a biquad and a summer to produce a transfer function configured to compensate for transmission line irregularities, wherein the adaptive portion receives the filtered replica of the local transmit signal and mathematically combines weighted signal components with a duplex signal to recover a remotely generated receive signal in a single operation at a hybrid amplifier.

2. The hybrid of claim 1, wherein the fixed portion comprises passive circuit elements.

3. The hybrid of claim 1, wherein the adaptive portion is implemented on an integrated circuit.

4. The hybrid of claim 1, wherein the biquad and the summer are implemented via a balanced differential circuit configuration.

5. The hybrid of claim 1, wherein the adaptive portion transfer function is modified to compensate for a bridged tap induced frequency notch.

6. The hybrid of claim 1, wherein the signal components comprise a band pass output a low pass output.

7. The hybrid of claim 2, wherein the passive circuit elements are selected and arranged to match the impedance of the combination of a standard isolation transformer associated with a local loop.

8. The hybrid of claim 5, wherein the bridged tap induced frequency notch comprises a range of frequencies where the phase of the local transmit signal exceeds a threshold beyond which the hybrid fails.

9. The hybrid of claim 6, wherein the signal components are weighted in the summer by controllable impedances.

10. A transceiver, comprising:
    an analog front end having a modified hybrid comprising:
    a first portion configured to match the effective impedance of a transmission line as seen at the analog front end in the absence of transmission line irregularities and to filter a duplex signal; and
    a second portion implemented on an integrated circuit, the second portion configured to receive the filtered duplex signal and adaptively compensate for at least one transmission line irregularity observed in the absence of a remote signal transmission.

11. The transceiver of claim 10, wherein the second portion is adaptively controlled to compensate for at least one transmission line irregularity reflective of environmental conditions surrounding the transmission line.

12. A method for configuring a local transceiver to minimize the transmit power required at a remote transmitter, comprising:
    applying a locally generated transmit signal to an improved front end in the absence of a remote signal, the front end containing a hybrid having a balance network further comprising a fixed portion and an adaptive portion;
    optimizing the transmit signal power;
    recording a reflected version of the optimized transmit signal in a receive path;
    applying the adaptive portion of the balance network when indicated by at least one characteristic associated with the reflected transmit signal;

controllably adjusting the adaptive portion of the balance network to minimize the amplitude of the reflected version of the transmit signal in the receive path; and notifying a remote transceiver to initiate a self-directed transmit signal power optimization scheme.

13. The method of claim 12, wherein the step of applying comprises supplying the locally generated transmit signal to a fixed portion of a hybrid configured to match the effective impedance of a transmission line as seen at the improved front end.

14. The method of claim 12, wherein controllably adjusting comprises performance of a steepest descent algorithm.

15. The method of claim 12, wherein controllably adjusting comprises performance of a recursive least squares (RLS) algorithm.

16. The method of claim 12, wherein the step of applying the adaptive portion of the hybrid is responsive to at least one transmission line characteristic reflective of a bridged tap associated with the transmission line.

17. A method for recovering a remotely generated signal from a transmission line in a duplex signal communication system, comprising:

applying a locally generated transmit signal to an improved front end in the absence of a remote transmit signal, the front end containing a hybrid having a balance network further comprising a fixed portion and an adaptive portion;

recording a reflected version of the optimized transmit signal in a receive path;

controllably adjusting the adaptive portion of the balance network to minimize the amplitude of the reflected version of the locally generated transmit signal in the receive path; and combining a scaled replica of the locally generated transmit signal with a plurality of adaptive portion outputs and a duplex signal on a transmission line to recover a remotely generated receive signal from the transmission line.

18. The method of claim 17, wherein the step of applying comprises supplying the locally generated transmit signal to a fixed portion of a hybrid configured to match the effective impedance of a transmission line as seen at the improved front end.

19. The method of claim 17, wherein controllably adjusting comprises performance of an optimization algorithm.

20. The method of claim 19, wherein the optimization algorithm is selected from the group consisting of a steepest descent algorithm and a recursive least squares (RLS) algorithm.

21. The method of claim 19, wherein the step of combining comprises weighting and mathematically combining signal components with the receive signal in a single operation at a hybrid amplifier.

* * * * *